(12) United States Patent
Ishiguro et al.

(10) Patent No.: US 7,249,956 B2
(45) Date of Patent: Jul. 31, 2007

(54) ELECTRIC CONNECTION BOX

(75) Inventors: Masaaki Ishiguro, Ogasa-gun (JP); Kazue Nishihara, Ogasa-gun (JP); Masataka Amano, Ogasa-gun (JP)

(73) Assignee: Yazaki Corporation, Tokyo (JP)

( * ) Notice: Subject to any disclaimer, the term of this patent is extended or adjusted under 35 U.S.C. 154(b) by 101 days.

(21) Appl. No.: 11/299,777

(22) Filed: Dec. 13, 2005

(65) Prior Publication Data

US 2006/0128181 A1   Jun. 15, 2006

(30) Foreign Application Priority Data

Dec. 13, 2004   (JP)   ............ P2004-360158

(51) Int. Cl.
 *H01R 12/00*   (2006.01)
(52) U.S. Cl. .................. 439/76.2; 439/949
(58) Field of Classification Search .......... 439/76.2, 439/949, 404, 405; 174/59
See application file for complete search history.

(56) References Cited

U.S. PATENT DOCUMENTS

| | | | | |
|---|---|---|---|---|
| 5,501,605 A | * | 3/1996 | Ozaki et al. ............ | 439/34 |
| 5,653,607 A | * | 8/1997 | Saka et al. ............ | 439/402 |
| 5,915,978 A | * | 6/1999 | Hayakawa et al. ........ | 439/76.2 |
| 5,920,034 A | * | 7/1999 | Saka et al. ............ | 174/59 |
| 6,315,578 B1 | * | 11/2001 | Kasai et al. ............ | 439/76.2 |
| 6,437,986 B1 | * | 8/2002 | Koshiba ................. | 361/752 |
| 6,796,808 B2 | * | 9/2004 | Hosoe et al. ........... | 439/76.2 |
| 6,923,671 B2 | * | 8/2005 | Uezono .................. | 439/404 |
| 2002/0157852 A1 | * | 10/2002 | Chiriku et al. .......... | 174/60 |
| 2004/0077191 A1 | * | 4/2004 | Murakoshi ............... | 439/76.2 |
| 2005/0233619 A1 | * | 10/2005 | Takeuchi et al. ......... | 439/76.2 |
| 2005/0239343 A1 | * | 10/2005 | Kashiwazaki ............ | 439/709 |

FOREIGN PATENT DOCUMENTS

| | | |
|---|---|---|
| JP | 2000139016 | 5/2000 |
| JP | 2000188814 | 7/2000 |
| JP | 2001320814 | 11/2001 |

* cited by examiner

*Primary Examiner*—Gary Paumen
(74) *Attorney, Agent, or Firm*—Sughrue Mion, PLLC

(57) ABSTRACT

An electric connection box includes a first cover and a second cover each having connector mounting portions, a first wiring board and a second wiring board which are mounted in a stacked manner between the first and second covers, a plurality of press-contacting terminals which are disposed in the connector mounting portions of the first and second covers, and are inserted in the first and second wiring boards, and a connecting wire which is selectively connected to the press-contacting terminals, and is arranged to extend over the first and second wiring boards when the first and second wiring boards are stacked together.

2 Claims, 6 Drawing Sheets

ELECTRIC CONNECTION BOX

BACKGROUND OF THE INVENTION

1. Field of the Invention

This invention relates to an electric connection box used, for example, in the interior wiring of an automobile.

2. Related Art

In one known conventional electric connection box, a wiring plate, having wires laid thereon, and an ECU board, having electronic parts soldered thereto, are received in a stacked manner within an upper case having connector mounting portions, and press-contacting portions of press-contacting terminals are connected to the wires laid on the wiring plate, and tab terminal portions project into the connector mounting portions, and a lower open portion of the upper case is closed by a lower case, and wiring plate engagement recesses are formed in inner surfaces of opposite side walls of the upper case, and engagement projections are formed on side walls of the wiring plate (see, for example, Japanese Patent Publication No. JP-A-2001-320814 (Pages 2 to 3, FIG. 1)).

In another known conventional electric connection box, wires are laid respectively on inner surfaces of lower and upper cases, and press-contacting terminals, driven into connectors mounted on the upper and lower cases, are connected to the wires (which are to be connected by press-contact) by press-contacting blades formed on upper and lower ends of connecting bus bars provided at side surfaces of the upper and lower cases (see, for example, JP-A-2000-188814 (Pages 3 to 5, FIG. 1)).

In a further known conventional electric connection box, wiring boards are stacked together, and wires are installed to extend sequentially along a lower surface of the second-layer wiring board, an upper surface of the first-layer wiring board and a lower surface of the third-layer wiring board, and a plurality of terminals are connected to the wires on the wiring boards, and the wires are connected to bus bars provided transversely in the wiring boards, and terminals of the bus bars project form the wiring boards, and the terminals are disposed between the bus bars, and a plurality of terminals are provided at a cover for receiving the wiring boards, and a power supply bus bar is provided at an extension portion of the wiring board (see, for example, JP-A-2000-139016 (Pages 3 to 5, FIG. 1)).

However, in the above JP-A-2001-320814, connectors can be mounted only on the upper case, and therefore many circuits can not be connected to the electric connection box.

In the above JP-A-2000-188814, the connectors can be mounted on both of the lower and upper cases, but free connection can not be easily made between the lower and upper cases since an insulating plate is disposed between the upper and lower terminals.

In the above JP-A-2000-139016, the bus bars are arranged in the longitudinal direction, and therefore connection in the transverse direction is limited, and in the case where the electric connection box is small in size, more circuits and joints can not be absorbed.

SUMMARY OF THE INVENTION

This invention has been made in view of the above circumstances, and an object of the invention is to provide an electric connection box in which the efficiency of layout of wire harnesses is enhanced by inserting connectors from both of upper and lower sides, thereby reducing the cost of the wire harnesses, and also circuits can be freely changed by changing a wiring layout.

1) According to the present invention, there is provided an electric connection box for connecting a plurality of circuits, characterized in that the electric connection box comprises a first cover and a second cover each having connector mounting portions; a first wiring board and a second wiring board which are mounted in a stacked manner between the first and second covers; a plurality of press-contacting terminals which are disposed at one end portions thereof in the connector mounting portions of the first and second covers, and are inserted at the other end portions thereof in the first and second wiring boards; and a connecting wire which is selectively connected to the press-contacting terminals, and is arranged to extend over the first and second wiring boards when the first and second wiring boards are stacked together.

In the invention of the above Paragraph 1), the first cover is disposed at the upper side, and the second cover is disposed at the lower side, and therefore a plurality of connectors, connected to a plurality of circuits, can be inserted from the upper and lower sides. The connecting wire is electrically connected to the press-contacting terminals (inserted in the first wiring board) on the first wiring board, and is also electrically connected to the press-contacting terminals (inserted in the second wiring board) on the second wiring board. At this time, the connecting wire is arranged to be connected to the first wiring board and the second wiring board, and when the first and second wiring boards are stacked together, the connecting wire, extending over the first and second wiring boards, electrically connects the upper first wiring board-side press-contacting terminals and the lower second wiring board-side press-contacting terminals together. And besides, the connecting wire are selectively connected to the first wiring board-side press-contacting terminals and the second wiring board-side press-contacting terminals, and therefore can connect the plurality of circuits via the first and second wiring board-side press-contacting terminals on the first and second wiring boards. Therefore, by inserting the connectors from both of the upper and lower sides, the efficiency of layout of wire harnesses is enhanced, and the cost of the wire harnesses can be reduced, and the circuits can be freely changed by changing the wiring layout.

2) The electric connection box of the above Paragraph 1) is further characterized in that at least one of the first cover and the second cover has an interconnecting device by which the electric connection box can be connected to another electric connection box identical in construction to the electric connection box.

In the invention of the above Paragraph 2), the plurality of electric connection boxes can be combined together by the use of the interconnecting device, and therefore many circuits can be connected. And besides, when the wiring operation is to be effected, the plurality of electric connection boxes are separated from each other, and the wiring operation can be effected for each single electric connection box, and therefore it is not necessary to effect the cumbersome operation in the combined condition of the electric connection boxes, so that the efficiency of the wiring operation can be enhanced.

In the electric connection box of the present invention, there are achieved advantage that the efficiency of layout of wire harnesses is enhanced by inserting the connectors from both of the upper and lower sides, thereby reducing the cost of the wire harnesses and that the circuits can be freely changed by changing the wiring layout.

DETAILED DESCRIPTION OF THE PREFERRED EMBODIMENTS

A preferred embodiment of the present invention will now be described in detail with reference to the drawings.

Figure 1:
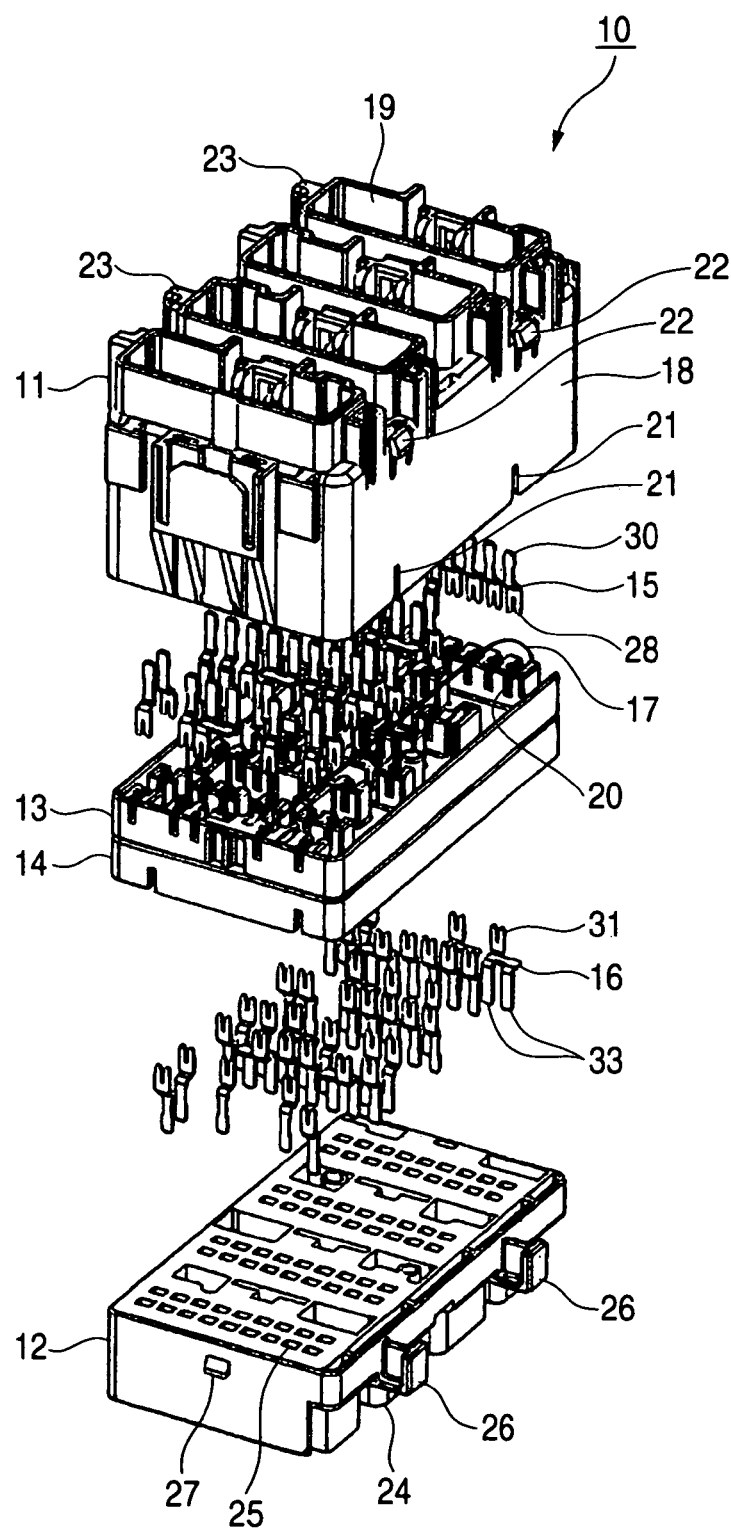
FIG. 1 is an exploded, perspective view of one preferred embodiment of an electric connection box of the present invention.
Figure 2:
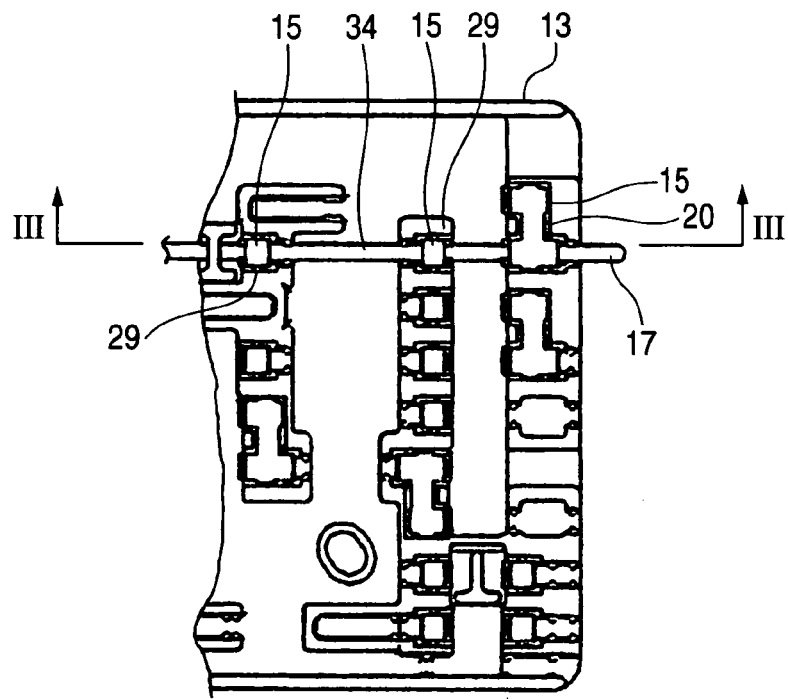
FIG. 2 is a plan view of a wiring board used in the electric connection box of FIG. 1.
Figure 3:
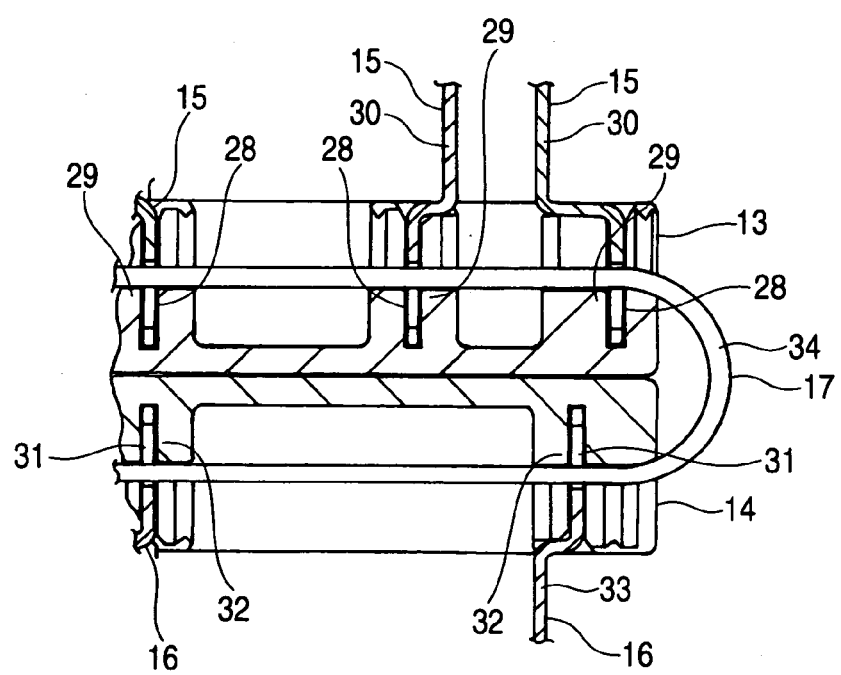
FIG. 3 is a cross-sectional view taken along the line III—III of FIG. 2.
Figure 4:
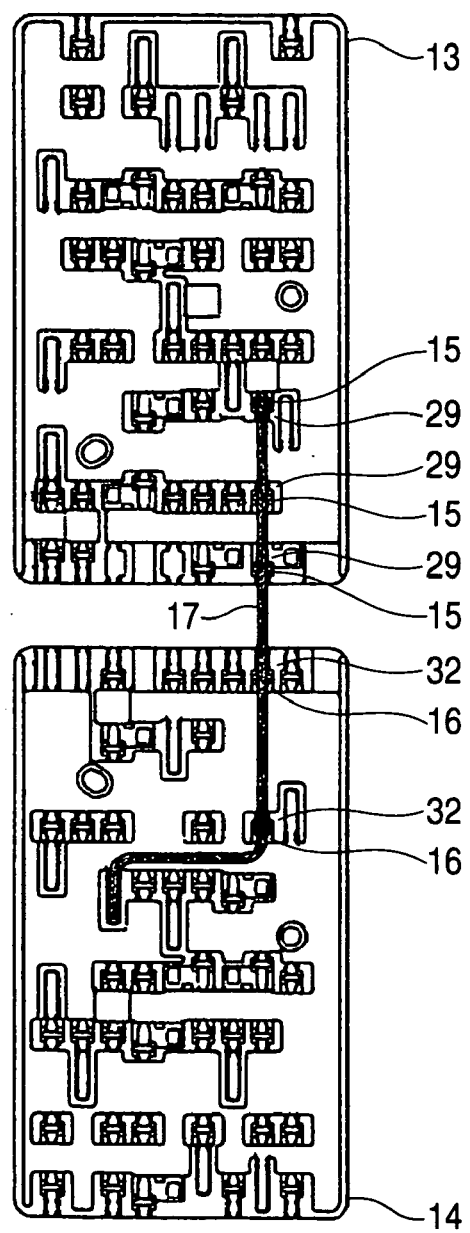
FIG. 4 is a plan view of the wiring boards in a developed condition, showing a condition of use of a connecting wire in the electric connection box of FIG. 1.
Figure 5:
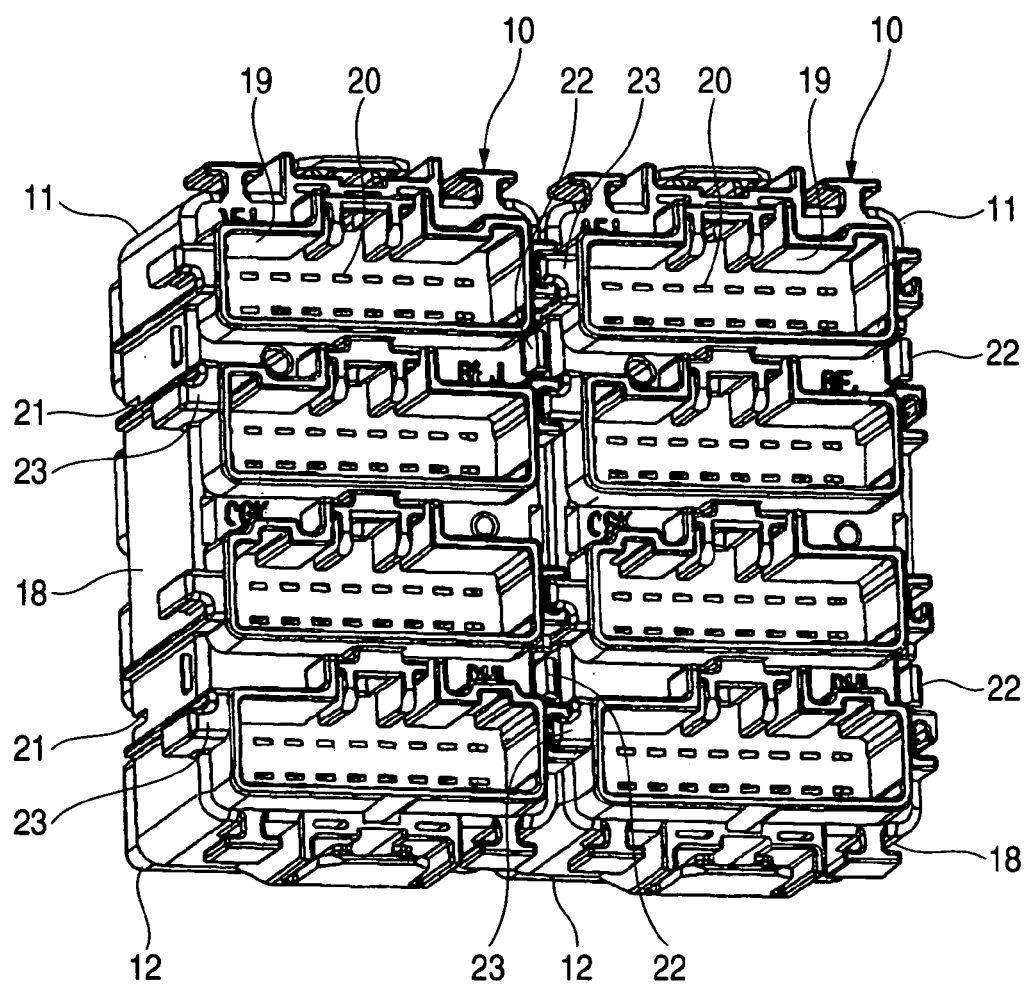
FIG. 5 is a perspective view showing the electric connection boxes of FIG. 1 combined together.
Figure 6:
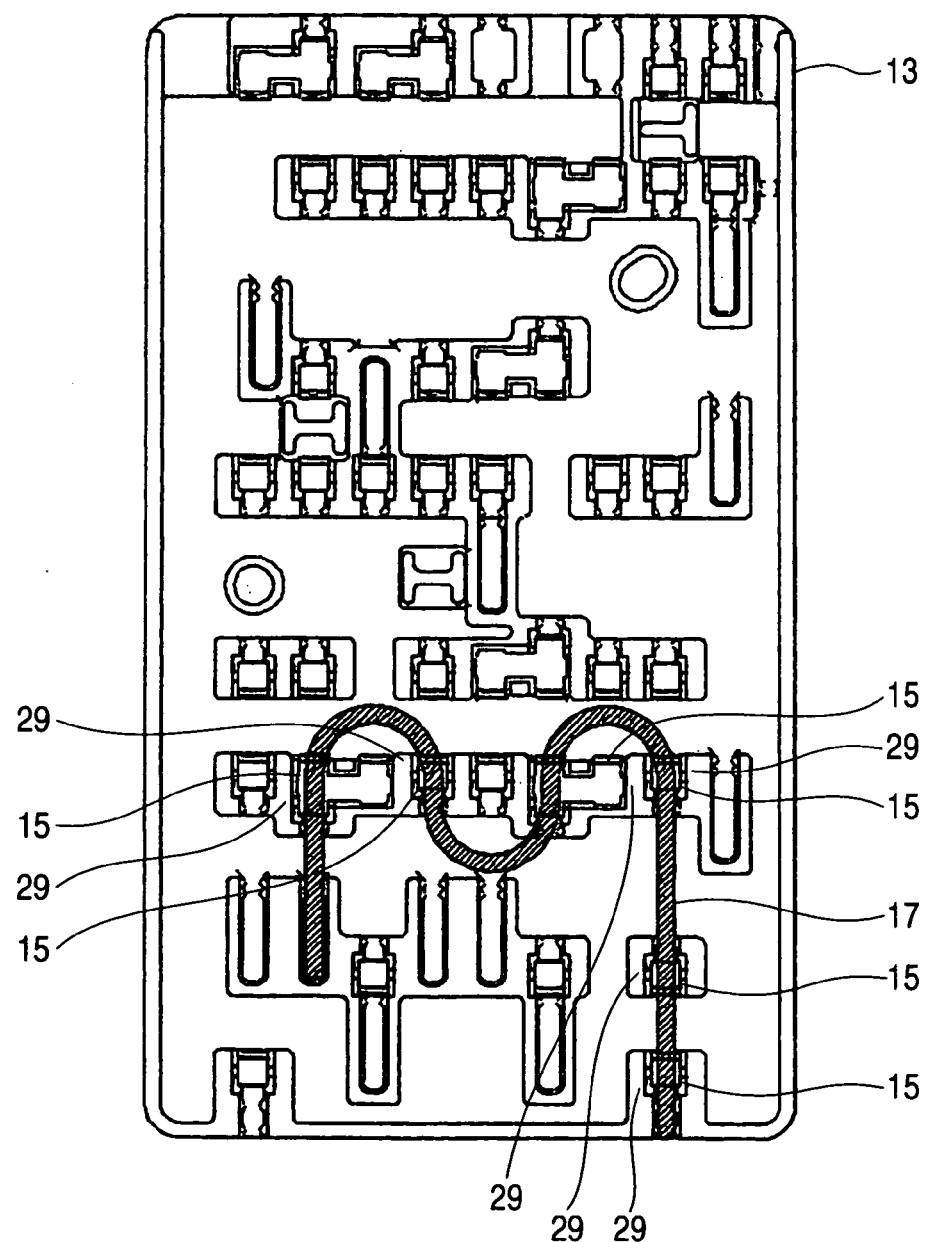
FIG. 6 is a plan view of the wiring board in a developed condition, showing a different form of use from that of FIG. 4.
Figure 7:
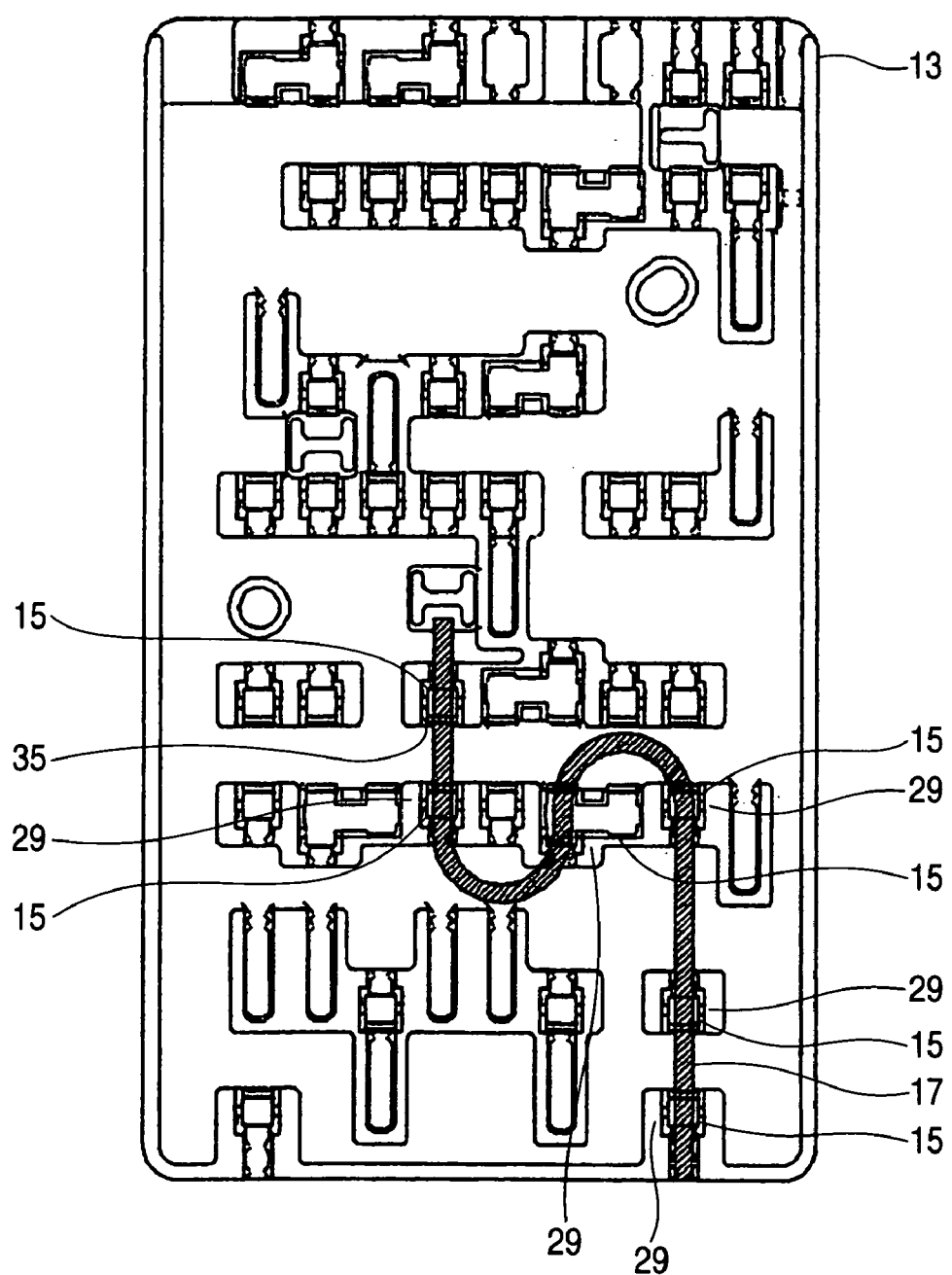
FIG. 7 is a plan view of the wiring board in a developed condition, showing another different form of use from that of FIG. 4.

FIG. 1 is an exploded, perspective view of one preferred embodiment of an electric connection box of the invention, FIG. 2 is a plan view of a wiring board used in the electric connection box of FIG. 1, FIG. 3 is a cross-sectional view taken along the line III—III of FIG. 2, FIG. 4 is a plan view of the wiring boards in a developed condition, showing a condition of use of a connecting wire in the electric connection box of FIG. 1, FIG. 5 is a perspective view showing the electric connection boxes of FIG. 1 combined together, and FIGS. 6 and 7 are plan views of the wiring board in a developed condition, showing different forms of use from that of FIG. 4.

As shown in FIG. 1, the electric connection box 10 of this embodiment comprises a first cover 11, a second cover 12, the first wiring board 13, the second wiring board 14, a plurality of first wiring board-side press-contacting terminals (press-contacting terminals) 15, a plurality of second wiring board-side press-contacting terminals (press-contacting terminals) 16, and the single connecting wire 17.

The first cover 11 is molded of an insulative resin material, and includes a side plate 18 defining four sides thereof, and four connector mounting portions 19 are provided at an upper surface of the first cover. Each of the connector mounting portions 19 has a plurality of terminal insertion holes 20 (shown in FIG. 5). The first cover 11 has slit-like engagement portions 21 which are formed in a lower end of each of opposed side portions of the side plate 18, and extend upwardly from a lower edge thereof. A pair of combination-purpose engagement projections 22 (each forming one of two constituent portions of an interconnecting device) are formed on one of the opposed side portions of the side plate 18, while a pair of combination-purpose engagement receptacles 23 (each forming the other constituent portion of the interconnecting device) are formed on the other side portion of the side plate 18.

The second cover 12 is formed into a generally block-shape, using an insulative resin material as described above for the first cover 11, and has four connector mounting portions 24 provided at its top surface, and a plurality of terminal insertion holes 25 are formed in each of the connector mounting portions 24. Engagement projections 26 of a T-shape for being inserted respectively into the corresponding engagement portions 21 of the first cover 11 are formed on and project from each of opposite side surfaces of the second cover 12. Retaining projections 27 for retaining engagement with an inner surface of the side plate 18 of the first cover 11 are formed respectively on the other side surfaces of the second cover 12. The second cover 12 is fitted into the inside of the side plate 18 of the first cover 11 in which the stacked first and second wiring boards 13 and 14 are received, and the engagement projections 26 are inserted respectively into the engagement portions 21, and the retaining projections 27 are retainingly engaged with the inner surface of the side plate 18, and in this manner the second cover 12 is attached to the first cover 11.

The first wiring board 13 is formed into a plate-like shape, using an insulative resin material, and has a predetermined thickness. A plurality of rows of terminal insertion portions 29 of a hole-like shape (into which press-contacting blades 28, formed respectively at lower ends of the first wiring board-side press-contacting terminals 15, are inserted, respectively) are formed in an upper surface of the first wiring board 13. The press-contacting blades 28 of the first wiring board-side press-contacting terminals 15 are press-fitted respectively into the plurality of terminal insertion portions 29 of the first wiring board 13, so that external connection portions 30, formed respectively at upper ends of the first wiring board-side press-contacting terminals 15, project upwardly from the first wiring board 13. A plurality of jumper wires (not shown) for forming circuits electrically connecting the first wiring board-side press-contacting terminals 15 together are incorporated in those selected from the plurality of terminal insertion portions 29. The press-contacting blades of the corresponding press-contacting terminals are electrically connected to the jumper wires, so that the first wiring board-side press-contacting terminals 15 jointly form the circuits. One side portion of the connecting wire 17 is incorporated in those selected from the plurality of terminal insertion portions 29, and therefore the press-contacting blades 28 of the corresponding press-contacting terminals are electrically connected to a conductor of the connecting wire 17, so that a circuit of the first wiring board-side press-contacting terminals 15 is formed via the connecting wire 17.

Like the first wiring board 13, the second wiring board 14 is formed into a plate-like shape, using an insulative resin material, and has a predetermined thickness. A plurality of rows of terminal insertion portions 32 (shown in FIG. 3) of a hole-like shape (into which press-contacting blades 31, formed respectively at upper ends of the second wiring board-side press-contacting terminals 16, are inserted, respectively) are formed in a lower surface of the second wiring board 14. The press-contacting blades 31 of the second wiring board-side press-contacting terminals 16 are press-fitted respectively into the plurality of terminal insertion portions 32 of the second wiring board 14, so that external connection portions 33, formed respectively at lower ends of the second wiring board-side press-contacting terminals 16, project downwardly from the second wiring board 14. A plurality of jumper wires (not shown) for forming circuits electrically connecting the second wiring board-side press-contacting terminals 16 together are incorporated in those selected from the plurality of terminal insertion portions 32. The press-contacting blades 31 of the corresponding press-contacting terminals are electrically connected to the jumper wires, so that the second wiring board-side press-contacting terminals 16 jointly form the circuits. The other side portion of the connecting wire 17 is incorporated in those selected from the plurality of terminal insertion portions 32, and therefore the press-contacting blades 31 of the corresponding press-contacting terminals are electrically connected to the conductor of the connecting wire 17, so that a circuit of the second wiring board-side press-contacting terminals 16 is formed via the connecting wire 17.

The connecting wire 17 has the conductor (not shown) covered with a sheath 34 (shown in FIG. 2), and has a predetermined length, and is used as a power wire (for example, a +12V wire). The one side portion of the connecting wire is incorporated into the selected terminal insertion portions 29 among the plurality of terminal insertion portions 29 at the first wiring board 13, and also the other side portion of the connecting wire 17 is incorporated into the selected terminal insertion portions 32 among the plurality of terminal insertion portions 32 at the second wiring board 14. Thereafter, the press-contacting blades 28 of the first wiring board-side press-contacting terminals 15 are press-fitted respectively into the selected terminal insertion portions 29 at the first wiring board 13, and also the press-contacting blades 31 of the second wiring board-side press-contacting terminals 16 are press-fitted respectively into the selected terminal insertion portions 32 at the second wiring board 14.

As a result, the conductor of the connecting wire 17 is electrically connected to the first wiring board-side press-contacting terminals 15, and is also electrically connected to the second wiring board-side press-contacting terminals 16. The end portions of the connecting wire 17 are held in an insulating manner on the first and second wiring boards 13 and 14, respectively. Instead of being used as the power wire, the connecting wire 17 can be used as a grounding wire for connection to a grounding circuit.

As shown in FIGS. 2 and 3, the first wiring board 13 and the second wiring board 14 are stacked or superposed together, and therefore the connecting wire 17 (which is electrically connected to the first wiring board-side terminals 15 inserted respectively in the selected terminal insertion portions 29 of the first wiring board 13, and is also electrically connected to the second wiring board-side terminals 16 inserted respectively in the selected terminal insertion portions 32 of the second wiring board 14) can electrically connect the first and second wiring board-side press-contacting terminals 15 and 16 together with the shortest distance at the upper and lower sides of the two wiring boards 13 and 14. Therefore, there is no fear that this connecting wire is affected by components such as disturbances.

When the connecting wire 17 is to be electrically connected to the first and second wiring board-side press-contacting terminals 15 and 16 inserted respectively in the selected terminal insertion portions 29 and 32, the first wiring board 13 and the second wiring board 14 are arranged in such a developed manner that the upper surface of the first wiring board 13 (at which the terminal insertion portions 29 are provided) is directed upward, while the lower surface of the second wiring board 14 (at which the terminal insertion portions 32 are provided) is directed upward, as shown in FIG. 4. Then, the connecting wire 17 is incorporated into the selected terminal insertion portions 29 of the first wiring board 13 in a manner to assume a generally I-shape, and then the connecting wire 17 is incorporated into the selected terminal insertion portions 32 of the second wiring board 14 in a manner to assume a generally crank-shape. Then, the first and second wiring board-side press-contacting terminals 15 and 16 are press-fitted respectively into the selected terminal insertion portions 29 and 32, so that the conductor of the connecting wire 17 is electrically connected to the first and second wiring board-side press-contacting terminals 15 and 16. At this time, the connecting wire 17 is mounted on and connected to the first and second wiring boards 13 and 14 disposed in the developed condition. Then, the first and second wiring boards 13 and 14 are turned relative to each other, with a central portion (serving as a bridging portion) of the connecting wire 17 bent, in such a manner that the lower surface of the first wiring board 13 and the upper surface of the second wiring board 14 are brought into intimate contact with each other, and as a result the first and second wiring boards 13 and 14 are stacked together (see FIG. 1).

The first and second wiring boards 13 and 14 (which are stacked together after the connecting wire 17 is incorporated in them) is received within the first cover 11, and the second cover 12 is attached to the first cover 11, thus assembling the electric connection box 10. As shown in FIG. 5, the combination-purpose engagement projections 22 of the electric connection box 10 are engaged respectively with the combination-purpose engagement receptacles 23 of another electric connection box 10 in an assembled condition, so that the two electric connection boxes 10 are connected or combined together in a unitary manner. The number of the electric connection boxes 10 to be interconnected is not limited to two, and can be three or more.

Next, different forms of use of the connecting wire 17 from that of FIG. 4 will be described with reference to FIGS. 6 and 7.

As shown in FIG. 6, the connecting wire 17 is incorporated in predetermined terminal insertion portions 29 of the first wiring board 13 in a manner to assume a generally W-shape, and is also incorporated in predetermined terminal insertion portions 32 of the second wiring board 14 disposed on the lower side of the first wiring board 13.

When the layout is changed, part of the connecting wire 17 can be withdrawn from the predetermined terminal insertion portion 29, and this withdrawn portion can be incorporated into a newly-selected terminal insertion portion 35 as shown in FIG. 7. This operation can be carried out similarly over the second wiring board 14, and therefore can be effected easily before the first and second wiring board-side press-contacting terminals 15 and 16 are press-fitted into the respective terminal insertion portions, and therefore the efficiency of the operation can be enhanced without the need for using a new connecting wire.

The above electric connection box 10 is assembled as described above, and connectors (not shown), provided at wire harnesses (not shown) connected to circuits, are inserted respectively into the connector mounting portions 19 of the first cover 11 from the upper side, while connectors (not shown), provided at wire harnesses (not shown) connected to circuits, are inserted respectively into the connector mounting portions 24 of the second cover 12 from the lower side. Then, the plurality of electric connection boxes 10 which are separate from one anther are combined together by the interconnecting device, and are fixed to a vehicle panel.

In the above electric connection box 10, the first cover 11 is disposed at the upper side, and the second cover 12 is disposed at the lower side, and therefore the plurality of connectors, connected to the plurality of circuits, can be inserted from the upper and lower sides. The connecting wire 17 is electrically connected to the first wiring board-side press-contacting terminals 15 (inserted in the first wiring board 13) on the first wiring board 13, and is also electrically connected to the second wiring board-side press-contacting terminals 16 (inserted in the second wiring board 14) on the second wiring board 14. At this time, the connecting wire 17 is arranged to be connected to the first wiring board 13 and the second wiring board 14, and when the first and second wiring boards 13 and 14 are turned relative to each other to be stacked together, the connecting wire 17, extending over the first and second wiring boards 13 and 14, electrically connects the upper first wiring board-side press-contacting terminals 15 and the lower second wiring board-side press-contacting terminals 15 together. And besides, the connecting wire 17 are selectively connected to the first wiring board-side press-contacting terminals 15 and the second wiring board-side press-contacting terminals 16, and therefore can connect the plurality of circuits via the first and second wiring board-side press-contacting terminals 15 and 16 on the first and second wiring boards 13 and 14. Therefore, by inserting the connectors from both of the upper and lower sides, the efficiency of layout of the wire harnesses is enhanced, thereby reducing the cost of the wire harnesses, and the circuits can be freely changed by changing the wiring layout.

The plurality of electric connection boxes 10 can be combined together by the use of the interconnecting device (comprising the combination-purpose engagement projections 22 and the combination-purpose receptacles 23), and therefore many circuits can be connected. And besides, when the wiring operation is to be effected, the plurality of electric connection boxes are separated from each other, and the wiring operation can be effected for each single electric connection box, and therefore it is not necessary to effect the cumbersome operation in the combined condition of the electric connection boxes, so that the efficiency of the wiring operation can be enhanced.

The present invention is not limited to the above embodiment, and suitable modifications, improvements and so on can be made. The number of the first wiring board-side press-contacting terminals, as well as the number of the second wiring board-side press-contacting terminals, is determined according to the number of circuits used in a vehicle. However, the electric connection boxes, having the same number of first wiring board-side press-contacting terminals and the same number of second wiring board-side press-contacting terminals, can be produced in a large number, in which case those terminals which are not used depending on the kind of vehicle can be used as dummy terminals.

The connecting wire is not limited to the illustrated sheathed wire, but can be a bare conductor, an electrically-conductive wire or the like.

The interconnecting device do not always need to be provided on the illustrated first cover 11, but can be provided on the second cover 12, and this is suitably determined according to the easiness of moldability.

What is claimed is:

1. An electric connection box for connecting a plurality of circuits comprising:
   a first cover and a second cover each having connector mounting portions;
   a first wiring board and a second wiring board which are mounted in a stacked manner between said first and second covers;
   a plurality of press-contacting terminals which are each disposed at one end portion thereof in said connector mounting portions of said first and second covers, and are inserted at other end portions thereof in said first and second wiring boards; and
   a connecting wire which is selectively connected to said press-contacting terminals, and is arranged to extend over said first and second wiring boards when said first and second wiring boards are stacked together.

2. An electric connection box according to claim 1, wherein at least one of said first cover and said second cover has an interconnecting device by which said electric connection box is connectable to another electric connection box identical in construction to said electric connection box.

* * * * *